(12) United States Patent
Cai et al.

(10) Patent No.: US 7,470,647 B2
(45) Date of Patent: Dec. 30, 2008

(54) NICKEL OXIDE NANOPARTICLES AS CATALYST PRECURSOR FOR HYDROGEN PRODUCTION

(75) Inventors: Mei Cai, Bloomfield Hills, MI (US); Yong Li, Liaoning (CN); Wenjie Shen, Liaoning (CN); Jerry Dale Rogers, Rochester Hills, MI (US)

(73) Assignees: GM Global Technology Operations, Inc., Detroit, MI (US); Dalian Institute of Chemical Physics, Chinese Academy of Sciences, Dalian (CN)

( * ) Notice: Subject to any disclaimer, the term of this patent is extended or adjusted under 35 U.S.C. 154(b) by 701 days.

(21) Appl. No.: 11/069,324

(22) Filed: Mar. 1, 2005

(65) Prior Publication Data
US 2006/0198782 A1 Sep. 7, 2006

(51) Int. Cl.
B01J 37/03 (2006.01)
B01J 37/08 (2006.01)
B01J 23/755 (2006.01)
C01G 1/02 (2006.01)
C01G 53/04 (2006.01)
C01B 3/26 (2006.01)
B82B 3/00 (2006.01)

(52) U.S. Cl. .............. 502/337; 423/138; 423/139; 423/140; 423/142; 423/143; 423/144; 423/145; 423/146; 423/147; 423/594.19; 423/653; 977/895; 977/896; 977/902; 977/903

(58) Field of Classification Search ............. 423/138, 423/140, 142, 143, 144, 145, 146, 147, 653, 423/139, 594.19; 502/337; 977/895, 896, 977/902, 903
See application file for complete search history.

(56) References Cited

U.S. PATENT DOCUMENTS

| | | | |
|---|---|---|---|
| 2,602,070 A | 7/1952 | Kirkpatrick | 252/472 |
| 2,696,475 A | 12/1954 | Farrow | 252/463 |
| 2,776,244 A | 1/1957 | Sowerwine, Jr. | 196/28 |
| 3,133,029 A | 5/1964 | Hoekstra | 252/466 |
| 3,186,957 A | 6/1965 | Stiles | 252/466 |
| 3,320,182 A | 5/1967 | Taylor et al. | 252/466 |
| 3,988,262 A | 10/1976 | Andersen et al. | 252/466 |
| 4,490,480 A | 12/1984 | Lok et al. | 502/315 |
| 6,509,000 B1 * | 1/2003 | Choudhary et al. | 423/652 |
| 6,953,488 B2 | 10/2005 | Bhattacharyya et al. | 48/198.7 |
| 7,005,405 B2 | 2/2006 | Suenaga et al. | 502/439 |

OTHER PUBLICATIONS

T. Zhang, M. Amiridis, Hdyrogen production via the direct cracking of methane over silica-supported nickel catalysts, Applied Catalysis, 1998, pp. 161-172.

T.V. Choudhary, D.W. Goodman, Stepwise methane steam reforming: a route to CO-free hydrogen, Catalysis Letters 59, 1999, pp. 93-94.

(Continued)

Primary Examiner—Timothy C Vanoy
Assistant Examiner—Serena L Hanor

(57) ABSTRACT

Decomposition of methane to produce carbon monoxide-free hydrogen is accomplished using un-supported, nanometer sized, hydrogen reduced, nickel oxide particles made by a precipitation process. A nickel compound, such as $NiCl_2$ or $Ni(NO_3)$ is dissolved in water and suitably precipitated as nickel hydroxide. The precipitate is separated, dried and calcined to form the NiO catalyst precursor particles.

17 Claims, 3 Drawing Sheets

OTHER PUBLICATIONS

T.V. Choudhary, D.W. Goodman, CO-Free Production of Hydrogen via Stepwise Steam Reforming of Methane, Journal of Catalysis 192, 2000, pp. 316-321.

V. Choudhary, S. Banerjee, A. Rajput, Continuous Production of H2 at Low Temperature of Methane Decomposition . . . , Journal of Catalysis 198, 2001, pp. 136-141.

T.V. Chourdhary, C. Sivadinarayana, C.C. Chusuei, A. Klinghoffer, D.W. Goodman, Hydrogen Production via Catalytic Decomposition . . . , Journal of Catalysis 199, 2001, pp. 9-18.

N. Shah, D. Panjala, G. Huffman, Hydrogen Production by Catalytic Decomposition of Methane, Energy & Fuels, 2001, pp. 1528-1534.

L. Pino, V. Recupero, S. Beninati, et al, Catalytic partial-oxidation of methane on a ceria-supported platinum catalyst for application . . . , Applied Catalysis, 2002, pp. 63-75.

V. Choudhary, S. Banerjee, A. Rajput, Hydrogen from stepwise steam reforming of methane over Ni/ZrO2: factors affecting catalytic . . . , Applied Catalysis, 2002, pp. 259-270.

International Search Report for PCT/US06/07688 dated Aug. 3, 2006 corresponding to this application.

* cited by examiner

NICKEL OXIDE NANOPARTICLES AS CATALYST PRECURSOR FOR HYDROGEN PRODUCTION

TECHNICAL FIELD

This invention pertains to the production of hydrogen from the decomposition of methane or other lower molecular weight hydrocarbon gasses. More specifically, this invention pertains to the preparation of nickel oxide nanoparticles as catalyst precursors for stepwise steam reforming of methane.

BACKGROUND OF THE INVENTION

Methane has been decomposed over supported metal catalyst particles at temperatures of about 300° C. to 500° C. to produce hydrogen and carbon. A goal of the process is to obtain hydrogen gas uncontaminated with carbon monoxide. Metals such as iron, nickel or palladium deposited as fine particles on high surface area oxides of aluminum, cerium, molybdenum, silicon, thorium or zirconium have been evaluated as catalysts. Certain zeolites have also been used as catalyst supports. Catalysts formed of nickel particles deposited on alumina, ceria, silica, or zirconia supports have attracted attention. The supported catalyst is confined in a heated flow-through reactor and methane, usually diluted with nitrogen, helium or the like, is passed over the catalyst at a suitable space velocity. Some methane decomposes to hydrogen and carbon. Hydrogen exits in the exhaust stream, also containing un-decomposed methane and diluent; and fine carbon particles deposit on the catalyst. Sometimes the metal oxide carrier also promotes the formation of carbon monoxide.

Deposited carbon gradually degrades the performance of the catalyst, but it can be re-generated by passing hot steam over the catalyst bed to oxidize the carbon to carbon dioxide and form more hydrogen. The product gas stream is a mixture of hydrogen, $CO_2$, and unreacted steam.

Thus, for continuous operation, the overall process comprises two-steps; hydrogen is produced in step one, and hydrogen and $CO_2$ are produced in step two. The process has been conducted using two parallel catalytic reactors with one bed catalyzing the decomposition of methane and the other bed being treated with steam for carbon removal and catalyst reactivation. In another practice mode, a single bed is alternately and cyclically contacted, first with methane and then with steam, to produce the hydrogen and $CO_2$ product streams. As observed, the methane content of the feed stream is not wholly decomposed and often the product stream contains some CO due to the use of oxygen-containing catalyst supports.

SUMMARY OF THE INVENTION

This invention provides un-supported, nanometer size, nickel oxide particles as catalyst precursors for carbon monoxide-free methane decomposition at relatively low temperatures of the order of 300° C. to 500° C. The nickel oxide particles are reduced with hydrogen before hydrocarbon decomposition begins. The catalyst particles promote uniformly high conversion levels of methane over prolonged periods before requiring interruption of methane flow for steam oxidation of deposited carbon particles and regeneration of the catalytic activity of the particles.

In accordance with the invention the nanometer size nickel oxide catalyst precursor particles are made using a precipitation process. A compound of nickel is dissolved in a convenient solvent to produce $Ni^{+2}$ ions. Water is preferred as the solvent; alcohols (ethanol) and glycols (ethylene glycol or propylene glycol) are also suitable. Nickel is precipitated from a stirred solution as a hydroxide or hydrated oxide under conditions that the precipitate can be easily filtered, dried and calcined to form NiO particles of nanometer scale. In general, it is preferred that the NiO particles have a diameter or major dimension no greater than about ten to fifteen nanometers for methane or lower alkane decomposition to hydrogen and carbon particles.

Common nickel (+2) compounds such as nickel chloride, nickel nitrate and nickel acetate are suitable precursors for the formation of NiO particles for methane decomposition and steam regeneration. Inexpensive and convenient bases such as sodium hydroxide or sodium carbonate may be used as the precipitating agent. Preferably the base is also used in solution for controlled addition to the precursor solution and the formation of a suitably small particle precipitate for conversion to nickel oxide particles of suitably uniform and small size. The selection of the solvent, the temperature of the solutions, the rate of their mixing and the aging of the precipitate-solution are processing factors that are evaluated in specifying a process for producing specific NiO catalyst particles. In general, the dried precipitate is calcined at a temperature of, e.g., 400° C. A mass of calcined individual nanometer sized NiO particles may be consolidated into clusters or grains of suitable mesh size for retention in a gas flow-through reactor for hydrogen production.

Prior to methane decomposition the nickel oxide particles are exposed to a reducing atmosphere, such as a stream of hydrogen at 450° C., for a couple of hours. The catalyst bed of reduced nickel oxide particles, presumably nickel particles, is then maintained at a suitable methane decomposition temperature such as 500° C. A feed gas comprising methane (which may be diluted with nitrogen or helium) is flowed through the particulate catalyst bed at a space velocity of, e.g., 15,000 ml $g^{-1}h^{-1}$. Methane molecules decompose to form hydrogen and very small carbon filaments or fibers which deposit on or between the catalyst particles. Hydrogen exits the reactor in the effluent stream with un-decomposed methane and diluent (if any was present). Gradually the deposited carbon reduces the activity of the Ni (reduced nickel oxide) catalyst particles. Analysis of the effluent gas may be used to indicate when removal of the carbon is necessary.

Methane flow to the reactor is then diverted or interrupted and superheated steam at, e.g., 500° C., is flowed into contact with the carbon filament containing nickel catalyst bed. The water reacts with the carbon to form an effluent stream of hydrogen and carbon dioxide. The mixed hydrogen containing stream may be used in a different application than the effluent stream from methane decomposition, or the carbon dioxide separated from the hydrogen. Following carbon removal, methane flow is restored to the regenerated catalytic reactor.

An advantage of using the unsupported reduced NiO catalyst of this invention is that the hydrogen product is free of carbon monoxide. Further, the decomposition of methane is accomplished at a lower catalytic reactor temperature than other alkane reformation processes. During experiments with the unsupported, reduced NiO particle catalysts of this invention, uniform methane to hydrogen conversion rates of nearly 50% have been obtained over periods of two to three hours before carbon removal has been required. It appears this methane decomposition catalyst, made from NiO precursor particles, better accommodates carbon deposits which form as small filaments or fibers. And the methane decomposition step and carbon removal step can be repeated over prolonged periods in useful hydrogen production.

Other objects and advantages of the invention will become apparent from a more detailed description of preferred embodiments which follows.

DESCRIPTION OF PREFERRED EMBODIMENTS

Figure 1:
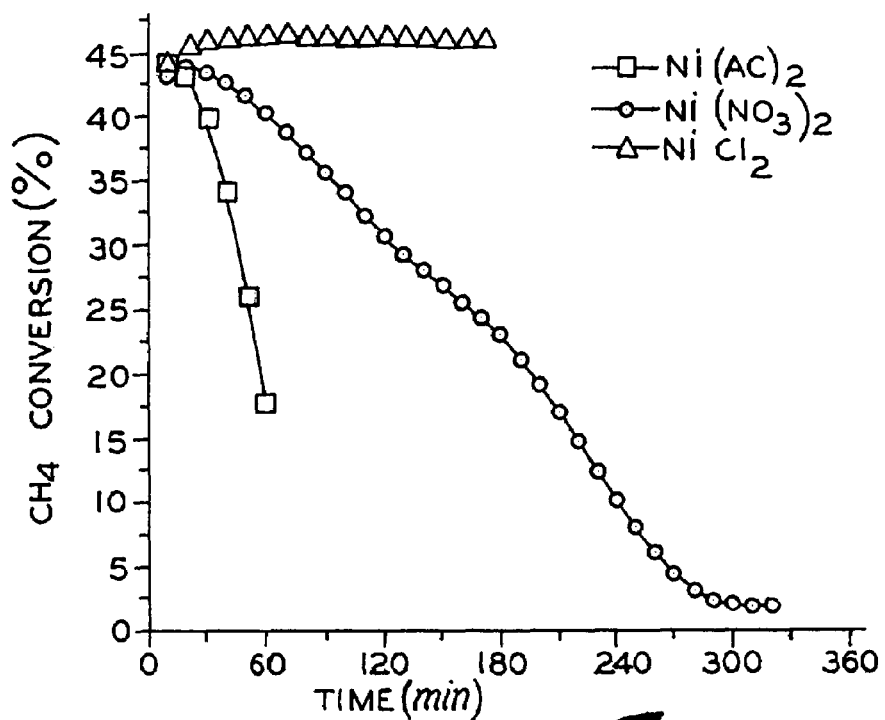
FIG. 1 is a graph of methane conversion (in percentage of methane charged) versus time (minutes) in a stream of diluted methane (10% methane in helium) flowing at a gas hourly space velocity (GHSV) of 15,000 ml g$^{-1}$h$^{-1}$ over unsupported reduced NiO catalysts at 500° C. The nickel oxide catalyst precursors were produced, respectively, from nickel acetate, nickel chloride and nickel nitrate. Each NiO precursor was reduced with hydrogen before methane conversion was started.

Nickel oxide catalyst precursors with different particle sizes were prepared by a precipitation technique through controlling processing parameters, such as the composition of nickel precursor compounds, solvent composition, solvent temperature and temperature at which the precipitating agent is added, composition of the base precipitating agent, and the rate of precipitating agent addition. The physico-chemical features of the NiO catalyst precursor materials were characterized with XRD, temperature-programmed techniques, and Transmission Electronic Microscopy (TEM). In general, the activities of these catalysts for methane decomposition were tested at 500° C., a desirably low temperature for hydrogen production by methane decomposition.

A precipitation process was employed to prepare nickel oxide particles by using different nickel precursors and precipitating agents. First, the nickel precursors were dissolved into water or water miscible solvents at ambient and warmer temperatures, followed by the addition of the precipitating solution through a liquid injection pump under vigorous stirring until the pH value of the mixed solution reached 10. The precipitate/mother liquor suspension was further aged for a few hours under stirring. The solid precipitate obtained was then filtered and washed with deionized water. Finally, the precipitate was dried overnight and calcined at 400° C. for 4 hours in air.

X-ray diffraction (XRD) analysis was used to confirm the formation of NiO particles and to determine their average particle size. The average particle sizes of nickel oxide particles were calculated from the Scherrer equation using the half-widths of their (111) diffraction lines. Each sample of calcined NiO powder was aggregated into a 40-60 mesh powder to facilitate loading into a flow-through catalytic reactor for evaluation of its methane decomposition and hydrogen production activity.

Methane decomposition reactions over the nickel catalysts were carried out in a fixed-bed quartz tube reactor. Prior to reaction, the selected catalyst precursor powder sample (0.2 g, 40-60 mesh) was reduced with a stream of diluted hydrogen (5% H$_2$/N$_2$) at 450° C. for 2.5 hours. Then, the catalyst was heated to 500° C. under the flow of helium. The feed gas of methane mixed with helium (10% CH$_4$/He) was then introduced. The effluent gas was analyzed by on-line Gas Chromatography (HP 6890N) with a thermal conductivity detector (TCD) and a flame ionization detector (FID).

Nickel Oxide Sample Preparation

Nickel Precursors

Nickel nitrate, nickel acetate and nickel chloride were used as nickel precursors to produce nickel oxide. An equivalent amount of each Ni$^{+2}$ compound was dissolved in water at ambient conditions (about 20° C.). Aqueous sodium carbonate solution was added at the same relatively low rate to the respective precursor solutions with vigorous stirring. Table 1 lists the average particle sizes in nanometers of nickel oxides obtained from these precursors after calcining of the respective precipitates.

TABLE 1

Effect of nickel precursors on the particle size of NiO

| Ni precursor | Average particle size of NiO, nm |
|---|---|
| Ni(AC)$_2$ | 10 |
| Ni(NO$_3$)$_2$ | 9 |
| NiCl$_2$ | 7.5 |

It is seen that different average particle sizes were obtained from the different precursor nickel compounds. These average size differences as determined by x-ray diffraction are significant. The three NiO particle catalyst precursors were tested as described above for their respective catalytic activities over time for the decomposition of methane and the production of hydrogen.

Figure 2:
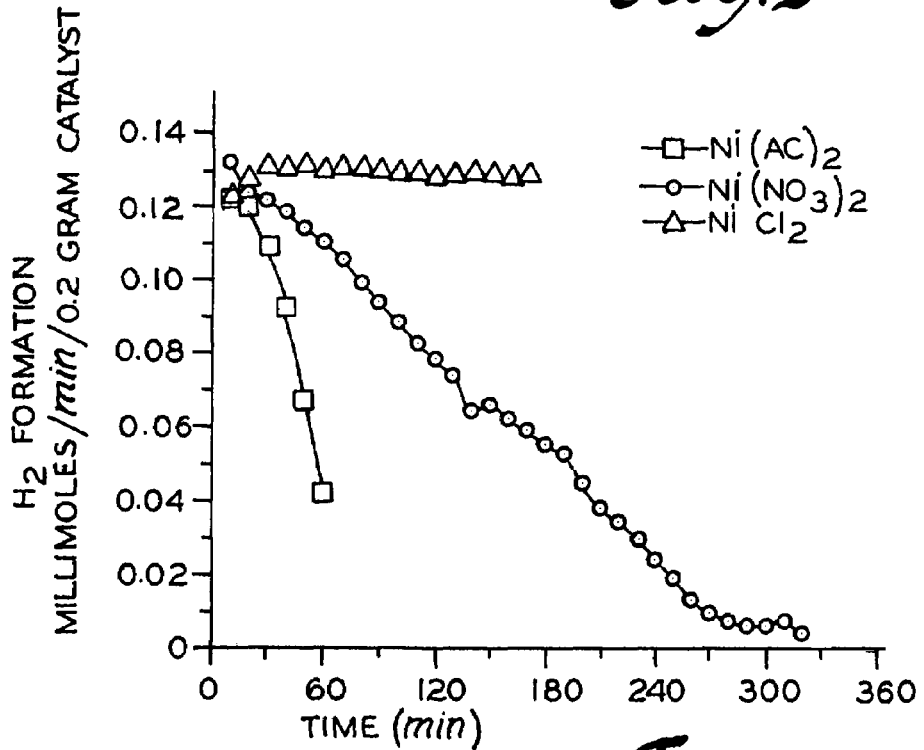
FIG. 2 is a graph of hydrogen formation in millimoles per minute per 0.2 gram of catalyst versus time in minutes for the same experimental methane decomposition conditions used to produce the data of FIG. 1.

FIG. 1 compares the catalytic activities of the three hydrogen reduced nickel oxides at 500° C. by presenting graphical data of the percentage conversion of methane in the feed stream over a period of 180 to 300 minutes as determined by analysis of the effluent stream from each experiment. FIG. 2 provides graphical data of the formation of hydrogen in millimoles per minute per 0.2 gram of catalyst.

In these comparative experiments, a strong particle size dependence of catalyst performance was observed. Here the smallest average particle size NiO catalyst provided the most promising catalytic performance. The NiO generated from the nickel chloride precursor showed the smallest particle size of 7.5 nm and the highest methane conversion (>45%) combined with the longest catalytic stability up to three hours before the pressure drop of gas flow through the reactor increased. This high stability implied that the carbon deposition capacity (often expressed by C/Ni ratio) is very high. The 9 nm size NiO particles prepared from nickel nitrate provided an intermediate activity and stability performance among the three experimental catalysts, and the 10 nm size NiO particles prepared from the nickel acetate exhibited the lowest catalytic activity as well as the lowest stability over time.

Addition Rate of Sodium Carbonate Solution

It was found that the addition rate of the base precipitating solution affects the precipitation rate of nickel hydroxide, and consequently the particle size of NiO after calcination. In the following tests, an aqueous sodium carbonate solution was used at room temperature to precipitate nickel hydroxide from a room temperature aqueous nickel salt precursor solution. The effect of the addition rate of sodium carbonate solution on the catalytic activity of reduced NiO was studied by using nickel nitrate as nickel precursor. Sodium carbonate solution (0.25 M) was added to aqueous solutions of nickel nitrate, initially of about 200 ml or so in volume. The nickel nitrate solutions were of 0.2 molar concentration, suitably 0.1-0.5 M. The pH of the nickel nitrate solution was monitored as precipitation proceeded, and the sodium carbonate addition was continued until a pH of 10 was reached at which level of alkalinity the $Ni^{+2}$ content of the solution was deemed fully precipitated. The precipitates were filtered, dried and calcined as described. The particle sizes of the NiO catalyst precursors as well as catalytic properties of the hydrogen reduced particles are summarized in Table 2 and FIGS. 3-4.

TABLE 2

Effect of addition rate of sodium carbonate solution on the particle size of NiO using nickel nitrate as nickel precursor

| Addition rate of $Na_2CO_3$ | Average particle size of NiO, nm |
|---|---|
| 0.2 ml/min | 6.5 |
| 0.83 ml/min | 9.0 |
| 4.2 ml/min | 9.1 |
| 5.3 ml/min | 10.4 |
| Very fast | 12.4 |

The data in Table 2 shows that slower addition of the precipitating sodium carbonate solution resulted in smaller NiO particles. "Very fast" mixing means that the solutions were dumped together. Slower addition of the precipitating base apparently resulted in the formation of a more homogeneous distribution of smaller nickel hydroxide particles during precipitation. Again, the smaller NiO particles led to better catalytic performance.

Figure 3:
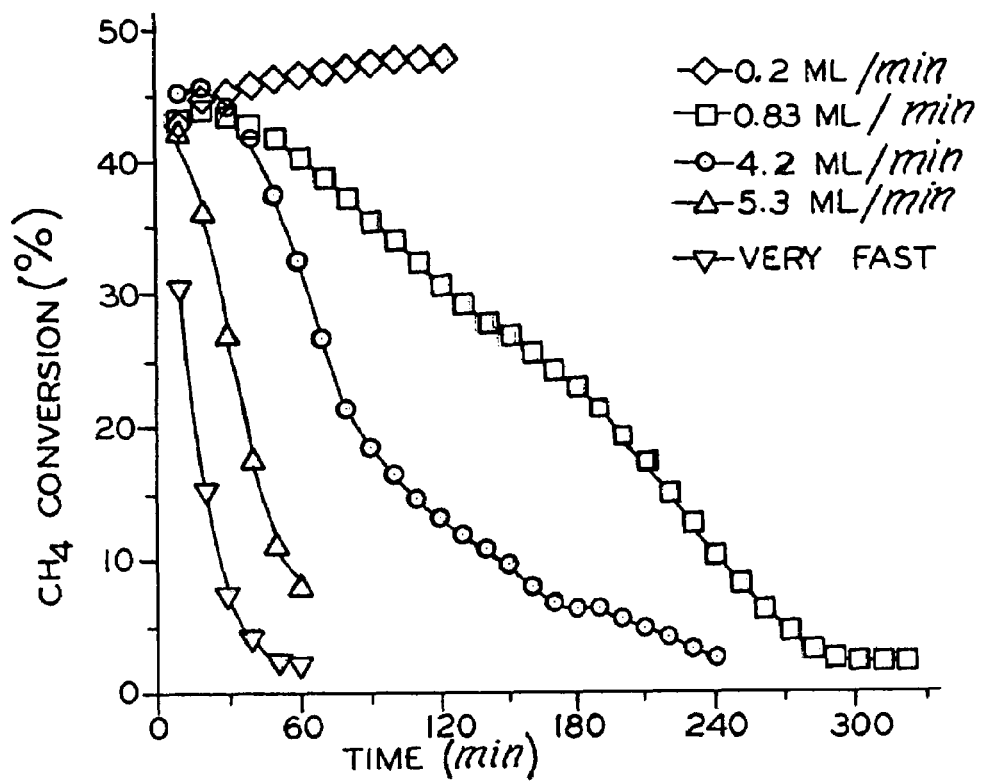
FIG. 3 is a graph of methane conversions (in percentage of methane charged) versus time (minutes) in streams of diluted methane (10% methane in helium) flowing at a gas hourly space velocity (GHSV) of 15,000 ml g$^{-1}$h$^{-1}$ over unsupported, hydrogen reduced NiO catalysts at 500° C. The nickel oxide catalyst precursors were produced from nickel nitrate using sodium carbonate as the precipitating agent and added at specified rates to identical aqueous solutions of nickel nitrate at room temperature. Each NiO precursor was reduced with hydrogen before methane conversion was started.
Figure 4:
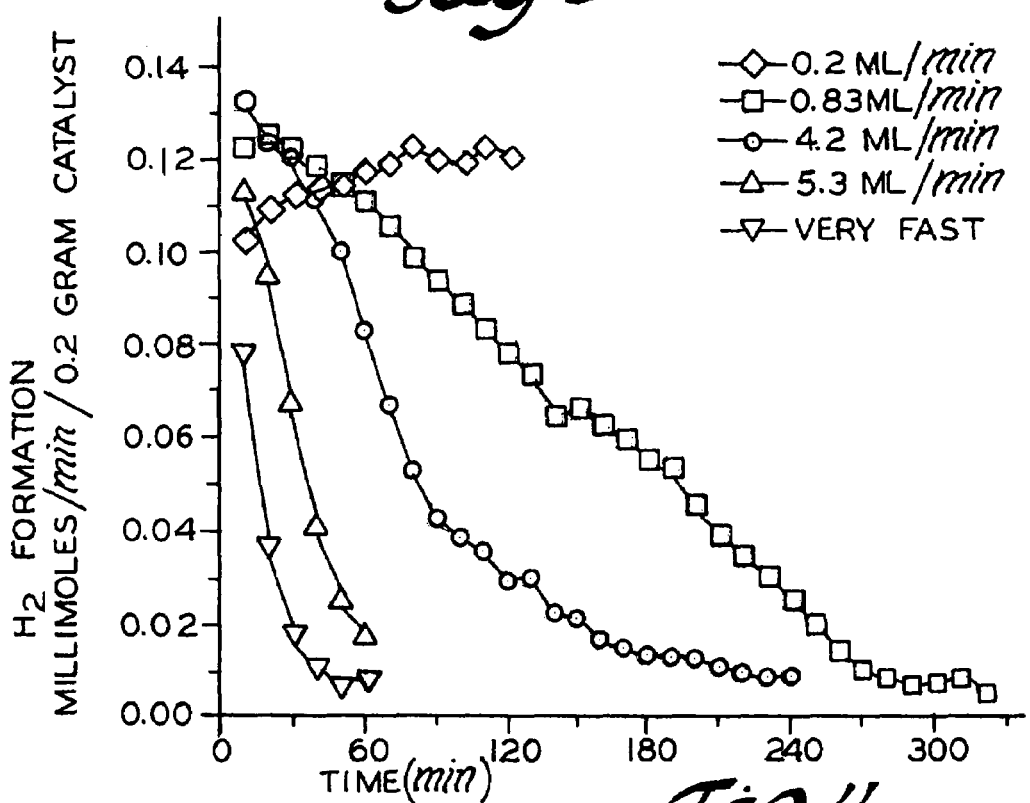
FIG. 4 is a graph of hydrogen formation in millimoles per minute per 0.2 gram of catalyst versus time in minutes for the same experimental methane decomposition conditions used to produce the data of FIG. 3.

FIG. 3 compares the catalytic activities of the five reduced nickel oxides at 500° C. by presenting graphical data of the percentage conversion of methane in the feed stream over a period of 60 to 300 minutes as determined by analysis of the effluent stream from each experiment. FIG. 4 provides graphical data over the same time period of the formation of hydrogen in millimoles per minute per 0.2 gram of catalyst. The 6.5 nm size NiO catalyst precursor particles produced with the slowest precipitant addition rate maintained high methane conversion rates (>45%) over two hours. The progressively larger NiO particles, made with progressively higher base addition rates had progressively lower conversion rates and lower hydrogen formation rates.

Precipitation Agent

It is found that the precipitation agent has a marginal effect on the particle sizes and the catalytic activities. The NiO catalysts made using $Na_2CO_3$, NaOH, and KOH precipitation agent solutions had similar nanometer scale particle sizes and showed similar catalytic activity and stability.

Aging Time

It is found that the NiO particle sizes become smaller with increasing the aging time of nickel hydroxide in the mother liquids. In both cases, $Ni(AC)_2$ and $Ni(NO_3)_2$ were employed as nickel precursors. With longer aging time, there is an increase in the catalytic activity and a greatly improved stability. Particle size data resulting from increased ageing times is summarized in Table 3. This data was obtained from room temperature aging tests.

TABLE 3

Effect of aging time on the average particle size of NiO.

| Aging time | Average particle size of NiO, nm |
|---|---|
| $Ni(AC)_2$-1 h | 8.4 |
| $Ni(AC)_2$-10 h | 6.8 |
| $Ni(NO_3)_2$-1 h | 9 |
| $Ni(NO_3)_2$-10 h | 6.4 |

Precipitation Temperature.

The precipitation temperature plays a significant role in governing the formation of nickel hydroxide and controlling the particle size of NiO. In water solvent, the NiO particle size ranged from 13.1 nm at 20° C. to 9.0 nm at 80° C. The NiO particle of 13.1 nm had almost no activity towards methane decomposition, while the methane conversion approached 40% over the NiO particles of 9.0 nm. However, a like result was not observed in an experiment when ethylene glycol was used as solvent to dissolve the nickel precursors. Precipitation at 120° C. resulted in the smallest NiO particles of 4.1 nm. However, this rather small particle did not show better catalytic activity than the NiO prepared at 80° C. with a relative larger particle size of 7.1 nm.

Solvent for Nickel Precursor

The solvent also appears to have an effect on NiO particle size. The particle sizes of NiO changed from 10 nm to 6.4 nm by employing different solvents to dissolve the nickel precursors (Table 4). The NiO particles of 6.4-6.8 nm prepared in ethanol (ETOH) and ethylene glycol (EG) showed the best catalytic activities. This result may be attributed to the nature of the fine dispersion of the nickel hydroxides in these organic solvents. It is noted that the NiO prepared in propylene glycol (PG) solvent has additional two peaks in XRD spectra, which suggests that the solvent has additional effects in determining the morphology of NiO.

TABLE 4

Effect of solvent on the average particle of NiO.

| Solvent | Average particle size of NiO, nm |
|---|---|
| $Ni(AC)_2$-$H_2O$ | 10 |
| $Ni(AC)_2$-EG | 6.8 |
| $Ni(AC)_2$-PG | 14.3 |
| $Ni(AC)_2$-ETOH | 6.4 |

Thus, the practice of the invention has been illustrated by dissolving a nickel salt in water, alcohol or glycol to obtain nickel ions ($Ni^{++}$) that can be precipitated as fine nickel hydroxide (or possibly hydrated nickel oxide) particles. The temperature of the Ni ion solution is suitably between ambient temperature and an elevated temperature below the boiling point of the solvent. A suitable base, such as sodium hydroxide or sodium carbonate is dissolved in a like solvent, miscible with the Ni ion solution and added to the Ni ion solution at a rate to form a uniformly fine precipitate. When aqueous solutions are used the base is added until the pH of the mixture is at least about 10. The solvent-precipitate mixture is preferably stirred and aged. Such aging appears to produce smaller and more uniformly sized precipitate particles. After aging, the precipitate is filtered or otherwise separated from the mother liquor, dried and calcined to form nanometer sized nickel oxide particles. In general, it is preferred that the NiO catalyst precursor particles have a particle size below about ten to fifteen nanometers for methane decomposition. The particles may be aggregated into larger granules for containment and use in a catalytic reactor for hydrogen production. The NiO particles are suitably reduced by hydrogen before use in methane decomposition.

A special NiO catalyst with a higher catalytic activity was prepared using a slight variation of the above summarized process. Nickel chloride was dissolved in water at 80° C. (suitably 0.1-0.5 M, preferably 0.2-0.3 M). NaCl was added to the $Ni^{+2}$ ion solution to form a supersaturated, or more saturated, aqueous solution. An aqueous NaOH solution was slowly added using a liquid injection pump with vigorous stirring of the saturated Ni and Cl ion solution until the pH value of the precipitate water mixture reached 10. The precipitate-water mixture was aged at 80° C. for 120 minutes (suitably about one to three hours) and the Ni containing precipitate was removed by filtration and dried. The dried precipitate was calcined and prepared for catalyst usage as described. The NiO had a particle size of about ten nanometers.

Figure 5:
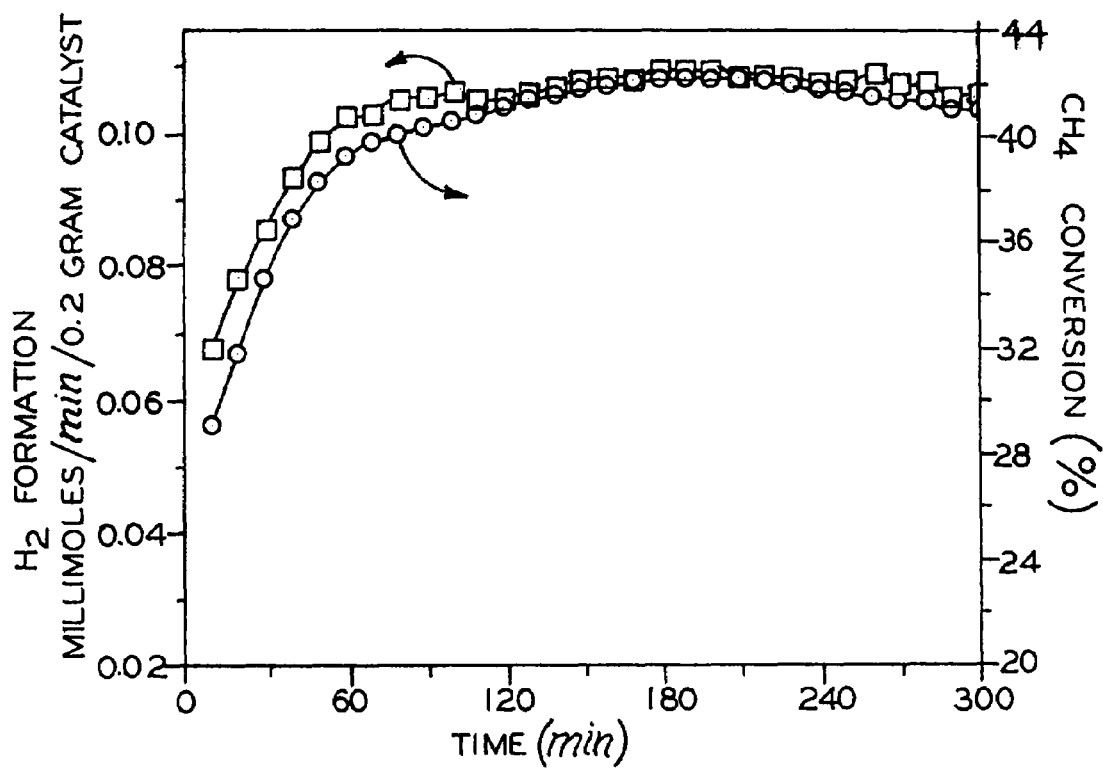
FIG. 5 is a graph of methane conversion (in percentage of methane charged) and hydrogen formation (millimoles per min. per 0.2 g catalyst) versus time (minutes) in a stream of diluted methane (10% methane in helium) flowing at a gas hourly space velocity (GHSV) of 15,000 ml g$^{-1}$h$^{-1}$, over unsupported, hydrogen reduced NiO catalyst at 500° C. The nickel oxide catalyst precursor was produced from nickel chloride in an aqueous solution to which sodium chloride had been added before precipitation of the nickel hydroxide.

From FIG. 5, it can be seen that this NiO catalyst exhibited a longer induction period—up to three hours—after which the catalytic activity became stable and lasted for about five hours. This extremely high stability and much higher carbon storage capacity should be related to the fine structural properties of this catalyst in addition to the particle size effect mentioned above.

NiO catalyst precursors with different particle sizes ranging from 4.0 nm to 15 nm were prepared by the described precipitation method practices. NiO particle sizes in the range of 6-10 nm displayed particularly good activity and durability in hydrogen production from methane. When the particle size decreased to 4.0 nm, the catalytic activity decreased or vanished, while a NiO catalyst with a particle size of 10.0 nm showed the extremely long stability.

Besides enhancing the decomposition of methane, the reduced NiO catalysts of this invention appear to cause carbon to deposit in catalyst bed in the form of small fine filaments or fibers that lie between and around the catalyst particles. This form of carbon deposit seems to permit somewhat longer methane decomposition cycles. The deposited carbon does not appear to coat and inhibit the catalyst particles as readily as in other $CH_4$ decomposition practices.

The practices of this invention are also believed to be applicable to the decomposition of other lower saturated hydrocarbons such as ethane and propane to produce hydrogen, but more rapid build-up of carbon on the catalyst is to be expected.

The practice of the invention has been illustrated with certain examples, but the scope of the invention is not limited to these examples.

The invention claimed is:

1. A method of making an unsupported catalyst for the decomposition of methane or other lower alkane to produce carbon monoxide-free hydrogen, the method comprising:

preparing a solution of $Ni^{+2}$ ions using a nickel salt;

adding a base to the solution to precipitate nickel hydroxide or hydrated nickel oxide;

aging the precipitate in the solution liquid;

separating the precipitate from the solution; and calcining the precipitate to obtain unsupported nickel oxide catalyst precursor particles having a particle size no greater than about fifteen nanometers;

the rate of addition of the base and the time of aging being determined to produce desired nickel oxide catalyst precursor particles from the nickel salt.

2. A method of making a catalyst as recited in claim 1 comprising preparing the solution of $Ni^{+2}$ ions in water and forming the precipitate by adding an aqueous solution of the base to the solution.

3. A method of making a catalyst as recited in claim 1 comprising preparing a solution of $Ni^{+2}$ ions by dissolving one or more nickel compounds selected from the group consisting of nickel chloride, nickel nitrate and nickel acetate in water.

4. A method of making a catalyst as recited in claim 1 comprising preparing a solution of $Ni^{+2}$ ions by dissolving one or more nickel compounds selected from the group consisting of nickel chloride, nickel nitrate and nickel acetate in an alcohol.

5. A method of making a catalyst as recited in claim 1 comprising adding a base to the solution of $Ni^{+2}$ ions, the base being dissolved in a solvent miscible with the solution of $Ni^{+2}$ ions.

6. A method of making a catalyst as recited in claim 5 comprising stirring the solution of Ni ions and adding the solution of base to the solution of Ni ions at a rate determined to yield NiO particles having a particle size in a specified range of nanometers up to a maximum of about fifteen nanometers.

7. A method of making a catalyst as recited in claim 1 comprising adding an aqueous solution of a base to an aqueous solution of $Ni^{+2}$ while stirring the mixed solutions and adding the solution of base to the solution of Ni ions at a rate determined to yield NiO particles having a particle size in a specified range of nanometers up to a maximum of about fifteen nanometers.

8. A method of making a catalyst as recited in claim 1 comprising preparing a solution of $Ni^{+2}$ ions by dissolving one or more nickel compounds selected from the group consisting of nickel chloride, nickel nitrate and nickel acetate in a glycol.

9. A method of making a catalyst as recited in claim 1 comprising aging the precipitate in the solution liquid for at least ten hours.

10. A method of making a catalyst as recited in claim 1 comprising aging the precipitate in the solution for at least one hour.

11. A method of making a catalyst as recited in claim 1 comprising calcining the precipitate to obtain nickel oxide catalyst precursor particles having a particle size of about six nanometers to about ten nanometers.

12. A method of making a catalyst as recited in claim 1 wherein the base is in solution and comprising adding the base to the solution of $Ni^{+2}$ ions at an addition rate of 0.2 ml/min to 5.3 ml/min until the pH of the solution is about 10 to precipitate nickel hydroxide or hydrated nickel oxide.

13. A method of making a catalyst for the decomposition of methane to produce carbon monoxide-free hydrogen, the method comprising:

preparing an aqueous solution of nickel chloride;

adding additional chloride ions to the aqueous nickel chloride solution;

stirring the nickel ion and chloride ion containing solution while adding a solution of a base to the nickel and chloride ion containing solution, the base being dissolved in a solvent miscible with the nickel and chloride ion containing solution, the rate of addition of the base being determined to yield NiO catalyst precursor particles having a particle size in a specified range of nanometers up to a maximum of about ten nanometers.

14. A method of making a catalyst as recited in claim 13 comprising preparing an aqueous solution of nickel chloride;

adding additional chloride ions to the aqueous nickel chloride solution as sodium chloride.

15. A method of decomposing methane to produce hydrogen comprising passing a stream of gas consisting essentially of methane in fluid flow contact with a catalyst consisting essentially of unsupported, hydrogen reduced nickel oxide particles having an average particle size no greater than about fifteen nanometers wherein the unsupported, hydrogen reduced, nickel oxide particles are made by the method comprising:

preparing a solution of $Ni^{+2}$ ions using a nickel salt;

adding a base to the solution to precipitate nickel hydroxide or hydrated nickel oxide;

aging the precipitate in the solution liquid;

separating the precipitate from the solution; and calcining the precipitate to obtain unsupported nickel oxide catalyst precursor particles having a particle size no greater than about fifteen nanometers;

the rate of addition of the base and the time of aging being determined to produce desired nickel oxide catalyst precursor particles from the nickel salt.

16. A method of decomposing methane to produce hydrogen gas as recited in claim 15 wherein the base is in solution and comprising adding the base to the solution of $Ni^{+2}$ ions at an addition rate of 0.2 ml/min to 5.3 ml/min until the pH of the solution is about 10 to precipitate nickel hydroxide or hydrated nickel oxide.

17. A method of decomposing methane to produce hydrogen gas as recited in claim 15 further comprising converting methane to hydrogen at a methane conversion rate of forty-five to fifty percent over a period of two to three hours without interrupting the passing of the stream of gas consisting essentially of methane.

* * * * *